United States Patent
Paoli

[15] 3,659,638
[45] May 2, 1972

[54] HEAVY DUTY MACHINE FOR PRODUCTION OF COMMINUTED MEAT AND OTHER FOODS

[72] Inventor: Stephen A. Paoli, 520 Sixth Street, Rockford, Ill. 61108

[22] Filed: Mar. 24, 1970

[21] Appl. No.: 22,151

Related U.S. Application Data

[63] Continuation-in-part of Ser. No. 859,717, Sept. 22, 1969, abandoned.

[52] U.S. Cl. ................................................146/76 R, 17/1
[51] Int. Cl. ................A22c 17/00, A22c 25/16, B02c 18/00
[58] Field of Search...............................146/76 R, 174, 176

[56] References Cited

UNITED STATES PATENTS 3,524,487    8/1970    Paoli.....................................146/76 R

*Primary Examiner*—Willie G. Abercrombie
*Attorney*—Wolfe, Hubbard, Leydig, Voit & Osann, Ltd.

[57] ABSTRACT

An improved separator machine for producing boneless comminuted meat and other smooth comminuted food products from a coarse agglomeration of fragmented hard and soft tissues which are separated automatically and continuously and discharged separately. The machine incorporates an improved mechanical separator utilizing a revolvable separator member reinforced structurally by cutting elements. The latter may also have external teeth. The machine is adapted to process raw material in a frozen, partially frozen or unfrozen state and is particularly suitable for processing red meat as well as poultry and fish.

15 Claims, 12 Drawing Figures

INVENTOR
STEPHEN A. PAOLI
By: Wolfe, Hubbard, Voit & Osann
ATTYS.

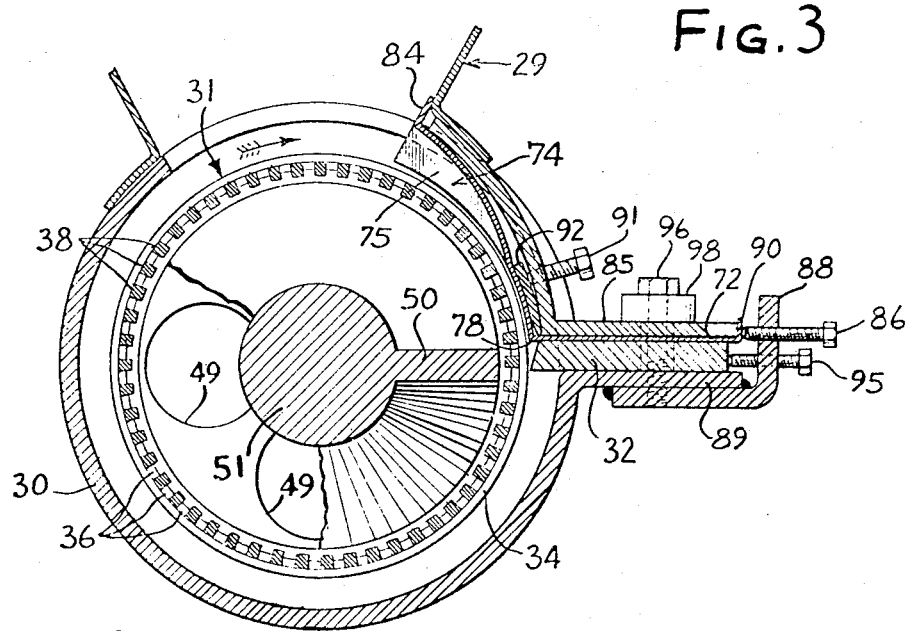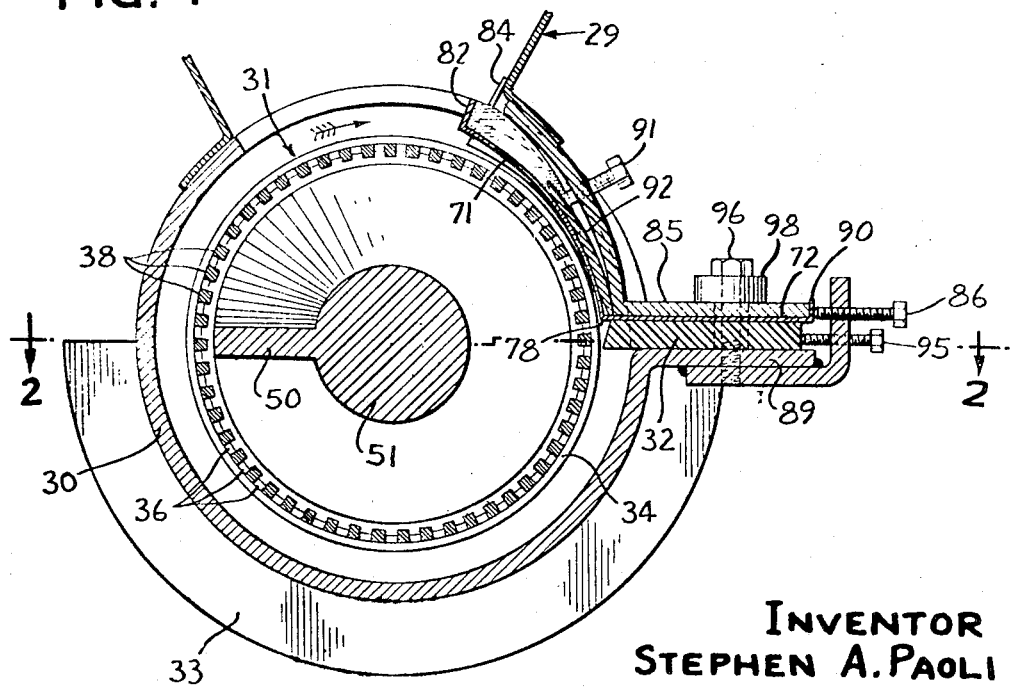

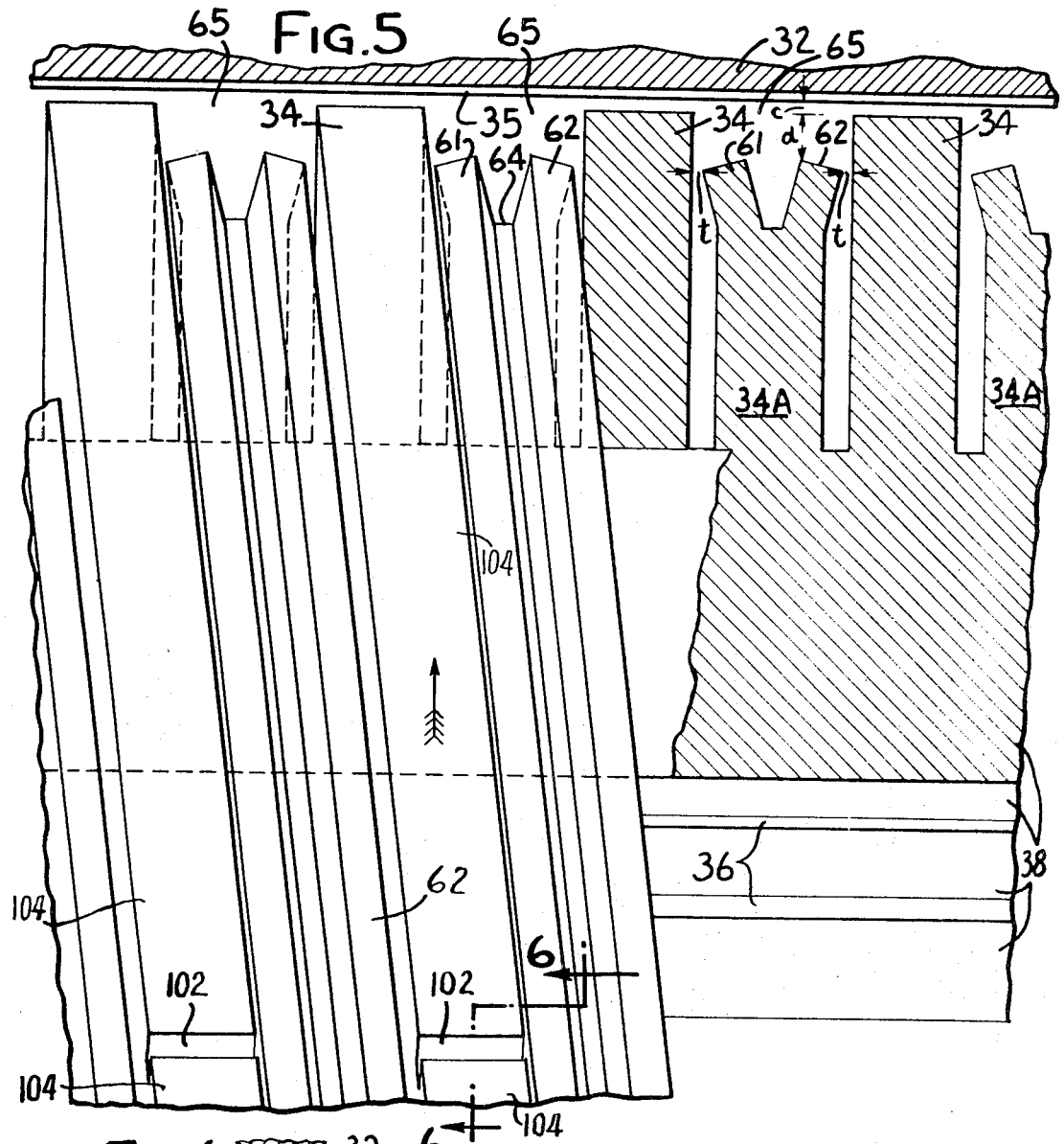

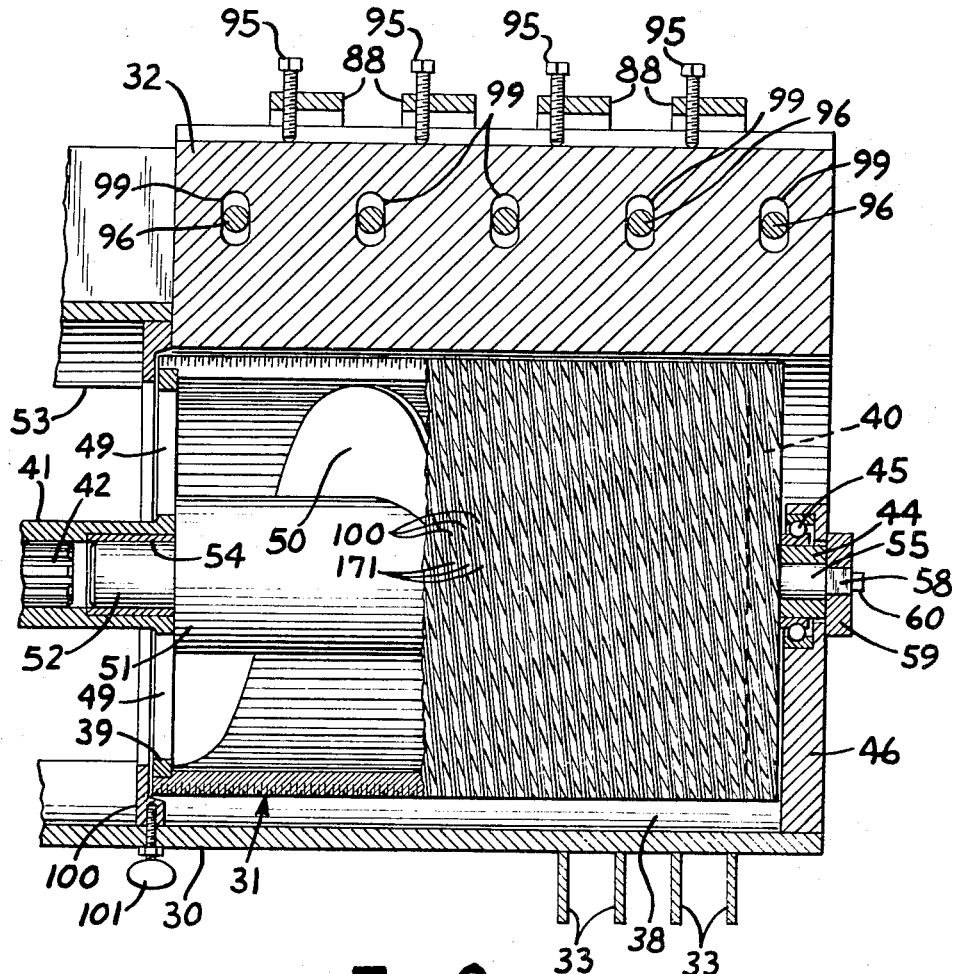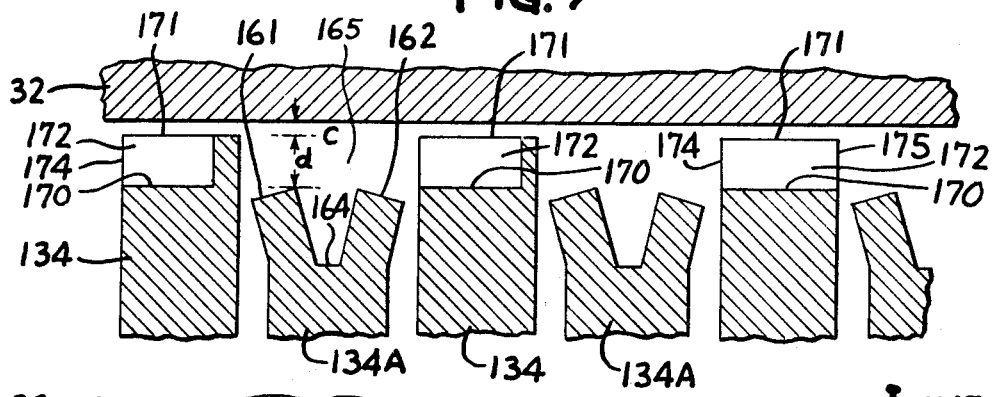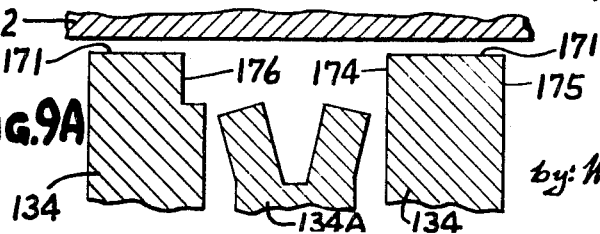

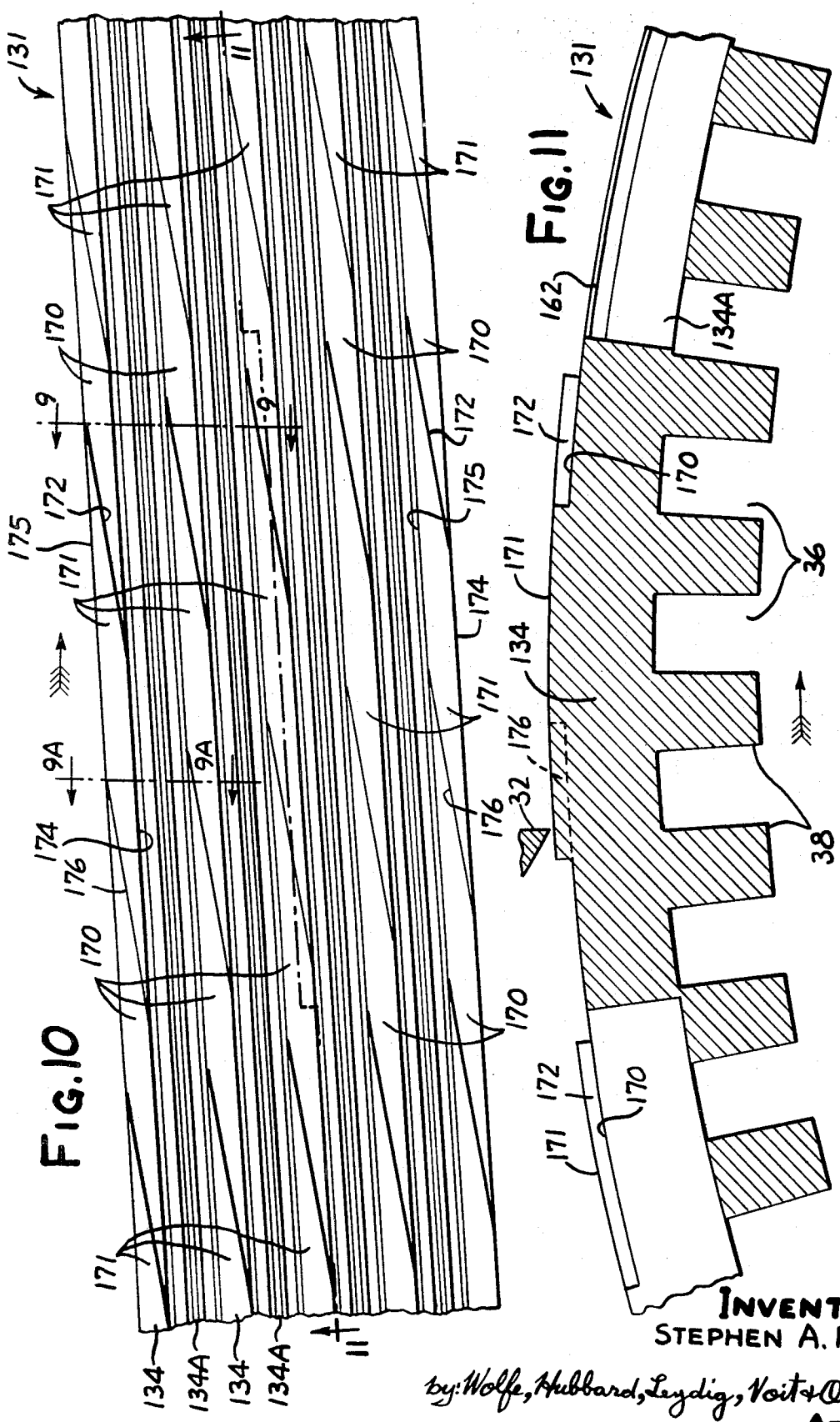

HEAVY DUTY MACHINE FOR PRODUCTION OF COMMINUTED MEAT AND OTHER FOODS

The present application is a continuation-in-part of my prior copending U.S. application Ser. No. 859,717, filed Sept. 22, 1969, now abandoned.

DESCRIPTION OF THE INVENTION

The present invention relates to food processing machinery and, more specifically, to a machine for producing boneless comminuted meat and other smooth comminuted food products from raw material such as a dressed animal carcass or any portion thereof, or whole fruit or vegetables, which material has been reduced to a coarse agglomeration of fragmented hard and soft tissues. The invention represents an improvement over the machines disclosed and claimed in my prior U.S. Pat. No. 3,266,542, issued Aug. 16, 1966, and in my prior copending U.S. Pat. No. 3,524,487, issued Aug. 18, 1970, and No. 3,552,461, issued Jan. 5, 1971.

The term "boneless comminuted meat," as used herein, denotes comminuted meat with substantially no entrained bone, cartilage, gristle, sinew or the like readily perceptible to the touch when held between the fingers. The term "dressed animal carcass," as used herein, denotes a conventional dressed whole carcass of a meat animal, such as beef, pork or lamb; a conventional dressed whole carcass of poultry, such as chicken or turkey, and a gutted but otherwise whole carcass of fish, including scales and fins. The term "portion," as applied herein to a dressed animal carcass, denotes any part thereof, such as a prime cut of beef or pork, also referred to as "red meat;" a neck, wing, or back of chicken or turkey; or a headed and gutted fish from which the filets have been removed. The term "smooth comminuted food products," as used herein, refers to the comminuted soft tissues of foods such as whole fruit or vegetables, with substantially no entrained fragments of hard tissue readily perceptible to the touch when held between the fingers.

One object of the present invention is to provide a machine for the continuous production of boneless comminuted meat and other smooth comminuted food products from a coarse agglomeration of fragmented hard and soft tissues by automatically and continuously removing those fragments perceptible to the touch, said machine including a mechanical separator structure of substantially higher strength and dimensional stability than those of the type known previously, making the machine exceptionally well adapted for processing red meat and other foods where the rejected tissues are particularly hard.

A further object of the invention is to provide an improved machine of the foregoing type having a mechanical separator adapted to accept with equal facility incoming material in a frozen, partially frozen or unfrozen state.

Another object is to provide an improved machine of the type set forth with a mechanical separator adapted to operate continuously with no appreciable increase in the temperature of the comminuted product produced.

Still another object is to provide an improved machine as above set forth and of simple, rugged construction adapted for easy disassembly and cleaning, complying in all respects with the high sanitation standards applicable to food processing equipment.

Other objects and advantages will become apparent as the following description proceeds, taken together with the accompanying drawings, in which.

Figure 2:
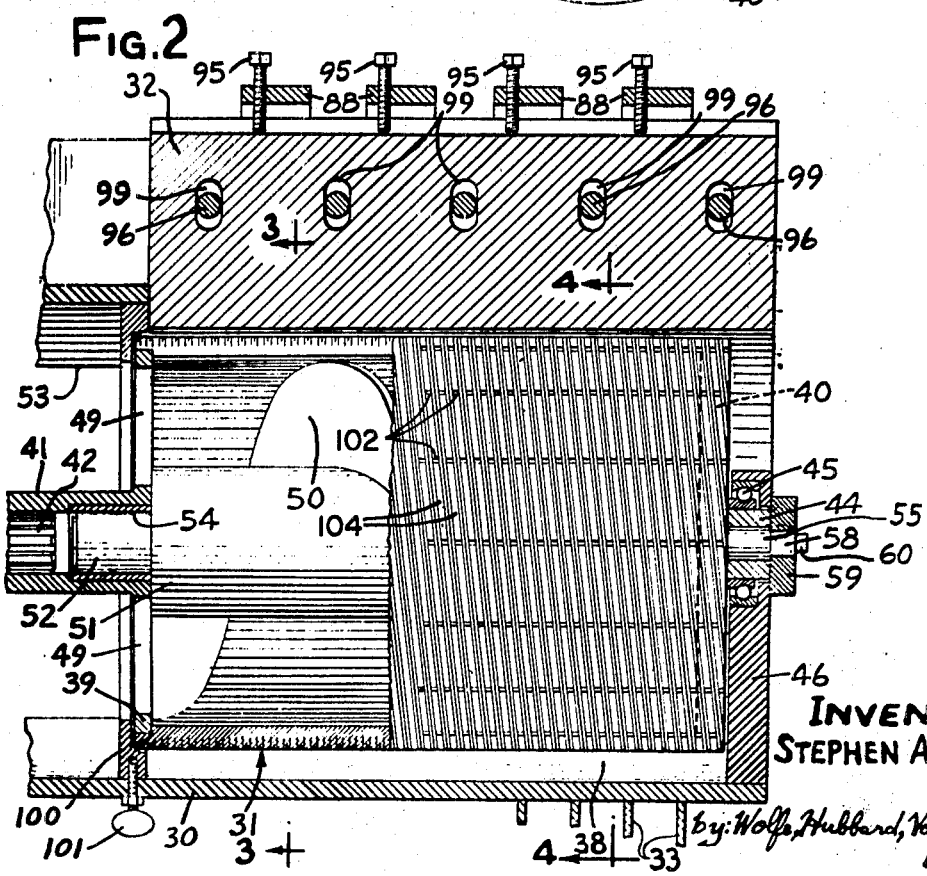
FIG. 2 is an enlarged fragmentary horizontal sectional view taken longitudinally through the machine of FIG. 1.

FIGS. 3 and 4 are enlarged fragmentary sectional views taken transversely through the separator unit of the illustrative machine as shown in FIG. 2, in the planes of the line 3—3 and 4—4, respectively.

FIG. 5 is a further enlarged fragmentary sectional view taken longitudinally of the revolvable member of the machine along the adjacent edge of the pressure bar.

FIG. 6 is an enlarged fragmentary sectional view taken transversely through a portion of the revolvable member and pressure bar in the plane of the line 6—6 in FIG. 5.

FIG. 7 is an enlarged fragmentary sectional view similar to FIG. 5 but showing a modification of the revolvable member.

FIG. 8 is an enlarged fragmentary horizontal sectional view similar to FIG. 2 but showing a modified form of revolvable member.

FIG. 9 is an enlarged fragmentary sectional view through a portion of the revolvable member of FIG. 8 adjacent the pressure bar, taken in the plane of the line 9—9 in FIG. 10. FIG. 9A is a similar view, taken in the plane of the line 9A—9A in FIG. 10.

FIG. 10 is an enlarged plan view of the outer peripheral surface of the revolvable member of FIG. 8.

FIG. 11 is an enlarged fragmentary sectional view taken transversely through a portion of the revolvable member in the plane of the line 11—11 in FIG. 10.

While the invention is susceptible of various modifications and alternative constructions, certain illustrative embodiments have been shown in the drawings and will be described below in considerable detail. It should be understood, however, that there is no intention to limit the invention to the specific forms disclosed but, on the contrary, the intention is to cover all modifications, alternative constructions, and equivalents falling within the spirit and scope of the appended claims.

Figure 1:
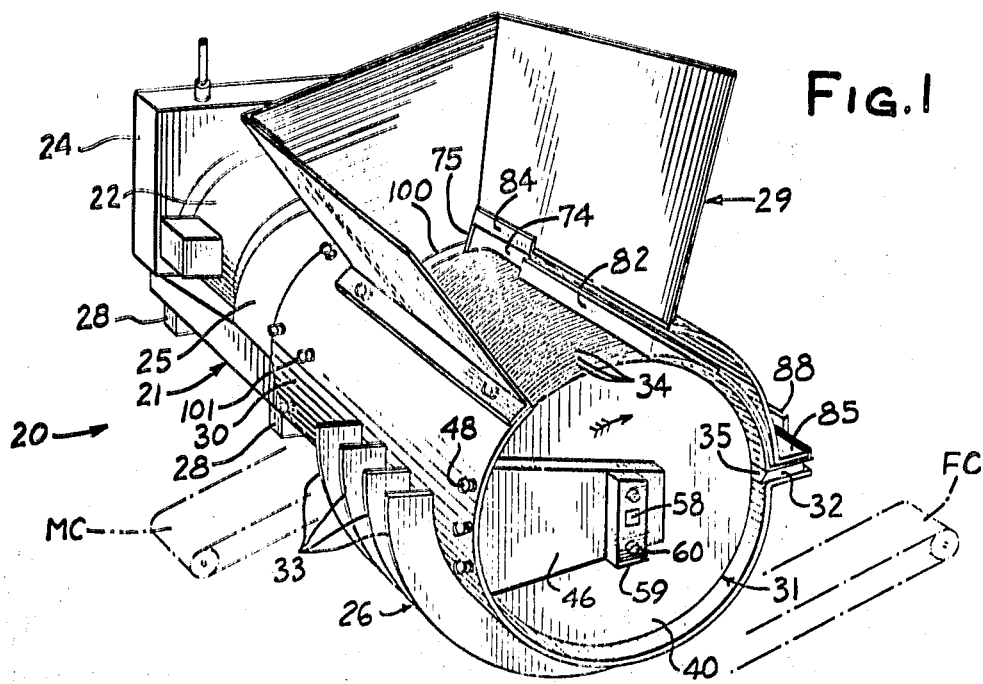
FIG. 1 is a perspective view of an illustrative machine for producing boneless comminuted meat and smooth comminuted food products, and which exemplifies the present invention.

Referring more specifically to FIG. 1, the present invention represents an improvement over the illustrative machine 20 disclosed herein, as well as the machines disclosed in my prior U.S. Pat. Nos. 3,266,542, 3,524,487 and 3,552,461, supra. It will be helpful by way of background to note that the machine 20 comprises a base assembly 21 which supports a drive motor 22 and controller 24, a reduction gear 25, and a separator unit 26. The base assembly 21 in this case is provided with feet 28 adapted for mounting on an appropriate support with the separator unit 26 extending in overhanging relation therefrom. Raw material in the form of a coarse agglomeration of fragmented hard and soft tissues of meat, or other food product such as whole fruit or vegetables, is received from a grinder or other suitable reducing device (not shown), and loaded into the machine separator unit 26 via hopper 29. The hard and soft tissues are automatically and continuously separated in the unit 26. The boneless comminuted meat or other smooth comminuted food product is discharged at the inboard end of the separator unit into a suitable conveyor or other collecting device shown diagramatically as MC. The separated fragments of bone and other hard tissue are discharged at the outboard end of the separator unit into a suitable collecting device shown diagrammatically as FC and which may also be a conveyor.

The separator unit 26, like that disclosed in my aforesaid patent, in this instance comprises a generally cylindrical casing 30 which houses a power driven revolvable member 31 and a cooperating pressure bar 32. The casing 30 may include one or more arcuate stiffening flanges 33 adjacent to its outboard end. The member 31 is fashioned as a hollow cylindrical rotor with a plurality of relatively thin, helical cutting elements 34, 34A disposed in closely spaced relation on its outer peripheral surface. The spaces between the cutting elements 34, 34A communicate with the interior of the member 31. At or adjacent to the pressure face on the outer peripheral surface of the member 31, these spaces are constricted to a width on the order of 0.008 inch, which is somewhat smaller than the average diameter of the smallest fragments to be removed. The pressure bar 32 is mounted longitudinally of the revolvable member 31 and has an adjacent edge 35 tapering progressively closer to the member 31 in the direction of the latter. The bar 32 is set at a clearance distance $c$ with respect to the member 31 which may be on the order of 0.007–0.010 inch.

The revolvable member 31 has a plurality of longitudinal slots 36 in its interior wall extending to the root diameter of the cutting elements 34, 34A and connecting with the grooves therebetween (FIGS. 2, 3, 4, 5 and 7). The slots 36 define a corresponding series of longitudinal lands 38 in the wall and which are integral with the cutting elements 34, 34A for structural rigidity. The member 31 has an end plate 39 rigidly fixed to its inboard end and an opposed end plate 40 detachably fixed to its outboard end. The end plate 39 (FIG. 2) is formed with an integral drive sleeve 41 adapted in this instance to telescopically interfit with the projecting end of power shaft 42 which is driven by the motor 21 via reduction gear 25. The sleeve 41 and shaft 42 may be suitably splined or keyed to form a detachable drive coupling. The end plate 40 (FIGS. 1, 2) is formed with an integral hub 44 which is journalled as by means of ball thrust bearing 45 in stationary support plate 46. The latter is detachably mounted at the outboard end of the casing 30 and secured in place as by screws 48 (FIG. 1).

The end plate 39 is formed with meat discharge apertures 49. Boneless comminuted meat or other smooth comminuted food product is removed from the revolvable member 31 and forced through the apertures 49 by means such as a fixed auger 50 having an auger shaft 51 (FIG. 2). From there it passes through discharge aperture 53 in the casing and drops to the discharge conveyor MC. The auger shaft has an integral extension 52 at its inboard end which is journalled as by means of sleeve bearing 54 in drive sleeve 41. The auger shaft also has an integral extension 55 at its outboard end extending through antifriction bearing 56 in end plate 40. The projecting end 58 of the auger shaft extension 55 is squared or otherwise shaped to interfit with a fixed bracket 59 secured to the plate 46 as by means of cap screws 60 (FIGS. 1 and 2).

In processing red meat of beef or pork, for example, the hardness of the bone and other hard tissues tends to cause accelerated wear and deformation in the revolvable member of the machine. Unless effectively met, this could result in a severe decrease in productivity after a relatively short period of service. This problem is overcome in the machine 20 through a novel structural arrangement which increases the longevity and productivity of the separator unit. Referring more specifically to FIGS. 2 and 5, it will be noted that such arrangement involves fashioning alternate ones of the cutting elements 34 of maximum radial cross section and the remaining cutting elements 34A of somewhat shorter radial cross section, the latter in this instance being bifurcated to define additional cutting edges. The outer diameter of the elements 34 thus defines the maximum outer diameter of the revolvable member 31, while the outer diameter of the elements 34A is substantially less than the maximum.

As shown more particularly in FIG. 5, the outer peripheral portion of each helical cutting element 34A has a pair of ribs 61, 62 formed therein. The ribs 61, 62 are separated by a blind groove 64 and diverge from each other toward the outer peripheral surface of the member 31. The rib 61 thus defines a constricted entrance or throat $t$, which may be on the order of 0.008 inch in width, in the open groove or passage between itself and its adjacent cutting element 34. In like manner, the rib 62 defines a similar constricted throat $t$, also on the order of 0.008 inch in width, in the passage between itself and its adjacent cutting element 34. This defines a pressure pocket 65 between the radial extremities of the ribs 61, 62 of each cutting element 34A and the radially extended portions of the adjacent cutting elements 34. The depth $d$ of the pocket 65 may, for example, be on the order of 0.035 to 0.050 inch. Meat or other food product, less fragments, is fed from the pocket 65 into the interior of the revolvable member 31 via the throat passages $t$ as the member 31 revolves past the pressure bar 32.

The helical cutting elements 34, 34A may be disposed at a variety of helix angles. In a machine such as the machine 20, with a revolvable member approximately 12 inches in diameter and operating at approximately 125 R.P.M., the cutting elements 34, 34A perform satisfactorily with a pitch of 1 turn in 3 inches. Fifteen elements 34, and 15 elements 34A are utilized, started at 12° angular intervals. This results in five cutting elements 34, five elements 34A, and 10 constricted passages $t$ per inch of axial length.

The machine 20 is also equipped with a regulator plate 70 which controls the feeding of raw material and coacts with the revolvable member 31 and the pressure bar 32 to define the work zone of the separator unit. The construction and operation of the regulator plate assembly is described in my U.S. Pat. No. 3,552,461, supra, and reference may be made thereto for further details. For present purposes, it will suffice to note that the regulator plate 70 comprises a concave spreader face 71 spaced apart in nested relation with the outer peripheral face of the revolvable member 31, and a mounting flange 72 which is adjustably clamped to the pressure bar 32. The upper left end portion of the regulator plate 70, as viewed in FIGS. 1, 3 and 4, is formed with a relatively long arcuate pocket 74 which diverges outwardly and upwardly from the concave spreader face 71 of the regulator plate and the outer peripheral surface of the member 31. The pocket 74 is bounded at the drive end of the member 31 by an arcuate flange 75 and at its opposite end by a tapered abutment 76 which serves as a retaining wall. The abutment 76 may run circumferentially of the member 31 or it may extend somewhat angularly downward toward the drive end of the member 31, causing the pocket 74 to taper in width as well as thickness toward the work zone. The upper portion of the regulator plate 70 terminates in upturned flanges 82, 84 extending up into the hopper (FIGS. 1, 3, 4).

The regulator plate 70 is mounted in operative position above the pressure bar 32 so that the lower edge 78 of its concave spreader face 71 is spaced from the surface of the member 31 by a clearance corresponding to that of the pressure bar, in other words, a clearance on the order of 0.007–0.010 inch (FIG. 4). The regulator plate 70 is adjustably clamped against the upper face of the pressure bar 32 by means of the mounting flange 72 and hold-down plate 85 (FIGS. 2, 3, 4). The plate 70, including its spreader face 71 and pocket 74, may be adjusted for clearance with respect to the revolvable member 31 as by means of a series of adjusting screws 86. The latter engage tapped holes in fixed adjusting brackets 88 secured to the outwardly extending casing flange 89 that supports the pressure bar. The screws 86 bear against a relatively narrow upturned flange 90 which, in turn, bears against the outer edge of the hold-down plate 85. The regulator plate 70 may be adjusted for orientation generally radially of the member 31 by means of a series of screws 91 situated at longitudinally spaced intervals in the casing 30 and adapted to bear against the back up plate 92. The brackets 88 also carry a series of adjusting screws 95 for the pressure bar 32. After adjustment, the pressure bar 32 and regulator plate 70 are secured in place by locking screws 96 which engage tapped holes in the brackets 88 and casing flange 89, engaging the hold-down plate 85 by means of collars 98. The hold-down plate 85 and mounting flange 72 of the regulator plate are fashioned with oversize or elliptical holes 99 to provide flexibility of adjustment.

In order to preclude leakage of unprocessed raw material into the boneless comminuted meat or smooth comminuted food product discharged via apertures 49 at the drive end of the member 31, resort is had to a fixed sealing ring 100 (FIG. 2). The ring 100 has an outer diameter adapted to fit snugly within the interior diameter of the casing 30 and is counter-bored to fit telescopically over the end portion of the member 31. The ring 100 is detachably secured in place as by means of a plurality of retaining screws 101 extending through suitable holes in the casing 30.

In the operation of the machine 20, raw material is directed into the work zone of the separator unit 26 and moves from left to right along the pressure bar 32, as viewed in FIGS. 1, 2 and 5. In the course of such action, comminuted meat or other food product, minus perceptible bone and/or hard tissue fragments, passes into the interior of the revolvable member 31 via the constricted passage $t$ and is ultimately discharged to the collecting means MC. The perceptible bone and/or hard tissue fragments are collected at the pressure bar and positively driven therealong by the revolvable member 31 to the fragment collecting means FC at the outboard end of the separator unit. By reason of frictional contact with the convolutions of the member 31, the temperature of the collected fragments tends to rise as they move toward their discharge point. This, in turn, tends to heat the outboard end portion of the revolvable member 31 and the meat or other food product which comes into contact with it.

In accordance with an important aspect of the invention, provision is made in the machine 20 for minimizing or eliminating undesirable frictional heating of the revolvable member 31 and the comminuted meat or other food product passing through it. This permits continuous operation of the machine with no appreciable increase in the temperature of the member 31 and the product upon which it is operating. The foregoing is accomplished by forming a series of circumferentially spaced transverse relief grooves and a corresponding series of circumferentially spaced teeth in the outer peripheral surfaces of helical cutting elements 34. Referring more specifically to FIGS. 2, 5 and 6, it will be noted that the outer peripheral portions of a number of the helical cutting elements 34 are formed with circumferentially spaced relief grooves 102 defining corresponding circumferentially spaced teeth 104 extending from the medial portion of the member 31 to its outboard end. Each such groove runs generally axially of the member 31 and may, for example, be on the order of 0.060 inch in width and 0.035 to 0.050 inch in depth. The specific dimensions for the most part are not critical but the depth should not exceed the dimension $d$ shown in FIG. 5. In other words, the relief grooves 102 should preferably avoid the radial extremities of the helical elements 34A. In the present instance, there are 15 such grooves 102 and teeth 104 in one complete turn of each helical element 34. The area of the member 31 where the cutting elements 34 contain such grooves and teeth extends at least from its medial portion to its outboard end.

As the member 31 revolves, the material being processed tends to move from the inboard end toward the outboard end thereof along the pressure bar 32. The soft tissue material continues to pass into the member 31 via the constricted passages $t$, increasing the concentration of bone and/or tissue fragments progressively toward the outboard end of the member 31. When accosted by the abrupt walls of the transverse relief grooves 102 and teeth 104, the material at the pressure bar 32 is broken up and the bone and hard tissue fragments, which are all somewhat irregular in shape, shift in position sufficiently to expose new surfaces to frictional engagement with the contacting surfaces of the member 31. Because of the substantial number of grooves 102 and teeth 104, this shifting process occurs with sufficient frequency to avoid undesirable temperature build-up in the rejected fragments, in the member 31, and in the product being produced.

Turning next to FIGS. 8 through 11, a modified form of machine 20A is there shown which also exemplifies the invention. The machine 20A is substantially identical with the machine 20 except for the configuration of the revolvable member. For convenience, like reference numerals will be applied to like parts and the description thereof set forth above with respect to the machine 20 will also apply to the machine 20A.

The revolvable member 131 of the machine 20A, like the member 31, is formed as a hollow cylindrical rotor with helical cutting elements 134, 134A arranged alternately along its length and defining a plurality of helical grooves therebetween. The helical grooves communicate between the exterior and interior of the member 131 and have constricted throats $t$ each on the order of 0.008 inch or adjacent the pressure face on the outer peripheral surface of the member 131. The cutting elements 134 are similar to the cutting elements 34 in that they extend to the full outer diameter of the member 131 but differ in configuration of their outer peripheral portion. The cutting elements 134A are substantially identical with the cutting elements 34A of the member 31, comprising diverging helical ribs 161, 162 separated by blind groove 164 and defining, with the pressure bar 32, a pressure pocket 165 between their radial extremities and the radially extended portions of the elements 134. The member 131 is mounted so as to have a clearance distance $c$, on the order of 0.007–0.010 inch, between the radial extremities of the elements 134 and the pressure bar 32. The remaining structure of the revolvable member 131, including longitudinal slots 36, lands 38 and end plates 39, 40, is substantially identical with that of the member 31. The other parts of the machine 20A associated with the member 131 correspond to those of the machine 20.

Provision is made in the machine 20A for continuous operation with no appreciable increase in the temperature of its revolvable member 131, in the product passing through it, or in the rejected fragments of bone and/or hard tissue. This is accomplished in a manner which also adapts the machine to process raw material effectively, whether in a frozen, partially frozen, or unfrozen condition. In keeping with the foregoing, it will be noted upon reference to FIGS. 8 through 11 that the outer peripheral portions of helical cutting elements 134 are formed with circumferentially spaced traverse relief grooves 170 defining therein corresponding circumferentially spaced teeth 171. In this instance, the depth of the grooves 170 may be on the order of 0.035 to 0.050 inch and preferably does not exceed the depth $d$ shown in FIG. 9 which represents the radial distance from the outer peripheral surface of the elements 134 to that of the elements 134A. The teeth 171 are of generally diamond-shaped form when viewed in plan, each comprising an inclined leading face 172, lateral faces 174, 175 coincident with those of its associated element 134, and an inclined trailing face 176. The teeth 171 are staggered circumferentially so that most, if not all of them, pass the pressure bar 42 progressively rather than at the same instant. They may be situated over a substantial portion of the member 131 and which may vary from the outboard end portion to virtually the entire length of the member 131.

The relief grooves 170 and teeth 171 may be fashioned in a variety of ways. In the machine 20A, it has been found desirable to form the grooves 170 by means of a milling cutter moved across the helical elements 134 at a substantially more gradual pitch than that of the elements themselves. In the machine 20A, with a revolvable member 131 approximately 12 inches in diameter operating at about 125 R.P.M., the cutting elements 134, 134A have a pitch of one turn in 3 inches, a lead angle of 4½°, and correspond in number and spacing to the elements 34, 34A of the machine 20, supra. The relief grooves 170 are overcut into the elements 134 by traversing a milling cutter therealong at a pitch of one turn in 8 inches and a lead angle of 12°. The cutter has a width approximately equal to the axial distance between two adjacent elements 134 and is operated to a depth $d$ of approximately 0.050 inch. This clears the radial extremities of the elements 134A and avoids the possibility of damaging the constricted throat passages $t$.

In operation of the machine 20A, as the member 131 revolves the raw material at the pressure bar 32, including accumulated fragments of bone and hard tissue will be accosted repeatedly by the teeth 171. The material will be contacted successively by the steeply inclined leading face 172 and the less steeply inclined adjacent lateral face 174 of each tooth (FIG. 10), and at closely spaced intervals, by the similar faces 172, 174 of succeeding teeth. This serves to break up the material and shift the bone and hard tissue fragments, constantly exposing new areas to frictional engagement with the peripheral surfaces of the member 131. By reason of such action, and also the air cooling effect derived from the exposed faces 172, 174, 175, 176 and top surfaces of the teeth 171, undesirable temperature build-up is avoided in the member 131, the rejected fragments, and in the product produced.

By reason of the configuration and arrangement of the teeth 171 above described, the machine 20A is adapted to operate effectively with raw material in a frozen, partially frozen, or unfrozen condition. This enhances the versatility of the machine 20A by adapting it to a wider variety of conditions in the food processing industry than has been possible heretofore.

Turning now to FIG. 7, there is shown fragmentarily a revolvable member 231 similar to the member 31 but further modified to enhance the positive movement of product through the work zone of the separator unit. The member 231 thus comprises helical cutting elements 234, 234A arranged alternately along its length. The cutting elements 234A are substantially identical with the cutting elements 34A of the member 31. The cutting elements 234 are similar to the cutting elements 34 but are formed with outer peripheral surfaces tapering radially toward their trailing edges. Each tapered surface 202 thus extends from the leading edge of the member 234, which defines the maximum diameter of the member 231, to the trailing edge of the member 234 which has a diameter corresponding approximately to the maximum outer diameter of the cutting elements 234A. By reason of this construction, the capacity of the pressure pocket extending over the elements 234A is enlarged and the radially projecting face of the leading edge portion of each element 234 at the rear of the pocket facilitates positive feeding of material along the pressure bar 32.

I claim as my invention:

1. A machine for producing boneless comminuted meat and other smooth comminuted food products by mechanically separating fragments of hard tissue perceptible to the touch from a coarse agglomeration of hard and soft tissues, and comprising, in combination:
   a. a machine casing;
   b. a hollow revolvable member mounted in said casing;
   c. a plurality of axially spaced helical cutting elements in said revolvable member defining a plurality of constricted helical grooves communicating between the exterior and the interior of said revolvable member;
   d. alternate ones of said helical cutting elements having an outer diameter defining the maximum outer diameter of said revolvable member;
   e. the remaining ones of said helical cutting elements having an outer diameter substantially less than the outer diameter of said revolvable member;
   f. means defining a pair of helical ribs in the outer peripheral portion of each said remaining one of said cutting elements, the ribs of each said pair being separated by a blind groove and diverging from each other toward the outer peripheral surface of said revolvable member;
   g. a pressure bar extending axially of said revolvable member and spaced from said alternate cutting elements by an amount not substantially greater than the smallest width of said constricted helical grooves;
   h. power means for revolving said revolvable member relative to said pressure bar and thereby adapted to force tissue without fragments into the interior of said revolvable member as the latter revolves;
   i. and means for removing tissue without fragments from the interior of said revolvable member as the latter revolves.

2. A machine for producing boneless comminuted meat and other smooth comminuted food products by mechanically separating fragments of hard tissue perceptible to the touch from a coarse agglomeration of hard and soft tissues, and comprising, in combination:
   a. a machine casing;
   b. a hollow revolvable member mounted in said casing;
   c. a plurality of axially spaced helical cutting elements in said revolvable member defining a plurality of constricted helical grooves communicating between the exterior and the interior of said revolvable member;
   d. alternate ones of said helical cutting elements having an outer diameter defining the maximum outer diameter of said revolvable member;
   e. said alternate ones of said helical cutting elements having circumferentially spaced transverse relief grooves defining corresponding circumferentially spaced teeth in their outer peripheral portion;
   f. the remaining ones of said helical cutting elements having an outer diameter substantially less than the outer diameter of said revolvable member;
   g. means defining a pair of helical ribs in the outer peripheral portion of each said remaining one of said cutting elements, the ribs of each said pair diverging from each other toward the outer peripheral surface of said revolvable member and toward said alternate ones of said cutting elements;
   h. a pressure bar extending axially of said revolvable member and spaced from said alternate cutting elements by an amount not substantially greater than the smallest width of said constricted helical grooves;
   i. power means for revolving said revolvable member relative to said pressure bar and thereby adapted to force comminuted tissue without perceptible fragments into the interior of said revolvable member as the latter revolves;
   j. and means for removing comminuted tissue without perceptible fragments from the interior of said revolvable member as the latter revolves.

3. A machine as defined in claim 2, wherein said transverse grooves are of a depth not exceeding half the difference between the maximum outer diameter of said revolvable member and the outer diameter of said remaining ones of said helical cutting elements.

4. A machine as defined in claim 2, wherein said transverse relief grooves extend helically of said revolvable member at a different pitch from that of said helical cutting elements.

5. A machine as defined in claim 2, wherein said helical cutting elements have a given pitch and said transverse relief grooves have a substantially more gradual pitch.

6. A machine as defined in claim 2, wherein said circumferentially spaced teeth are generally diamond-shaped and are staggered circumferentially.

7. In a machine for producing boneless comminuted meat and other smooth comminuted food products by mechanically separating fragments of hard tissue perceptible to the touch from a coarse agglomeration of hard and soft tissues, a hollow revolvable member comprising, in combination:
   a. a plurality of axially spaced helical cutting elements in said revolvable member defining a plurality of constricted helical grooves communicating between the exterior and the interior of said revolvable member;
   b. alternate ones of said helical cutting elements having an outer diameter defining the maximum outer diameter of said revolvable member;
   c. the remaining ones of said helical cutting elements having an outer diameter substantially less than the outer diameter of said revolvable member;
   d. and means defining a pair of helical ribs in the outer peripheral portion of each said remaining one of said cutting elements, the ribs of each said pair diverging from each other toward the outer peripheral surface of said revolvable member and toward said alternate ones of said cutting elements.

8. In a machine for producing boneless comminuted meat and other smooth comminuted food products by mechanically separating fragments of hard tissue perceptible to the touch from a coarse agglomeration of hard and soft tissues, a hollow revolvable member comprising the combination of:
   a. a plurality of axially spaced helical cutting elements in said revolvable member defining a plurality of constricted helical grooves communicating between the exterior and the interior of said revolvable member;
   b. alternate ones of said helical cutting elements having an outer diameter defining the maximum outer diameter of said revolvable member;

c. said alternate ones of said helical cutting elements having circumferentially spaced transverse relief grooves defining corresponding circumferentially spaced teeth in their outer peripheral portion;
d. the remaining ones of said helical cutting elements having an outer diameter substantially less than the outer diameter of said revolvable member;
e. means defining a pair of helical ribs in the outer peripheral portion of each said remaining one of said cutting elements, the ribs of each said pair diverging from each other toward the outer peripheral surface of said revolvable member and toward said alternate one of said cutting elements defining constricted passages with the latter.

9. The combination set forth in claim 8, wherein said teeth on said alternate helical cutting elements are spaced circumferentially and staggered with respect to the teeth of adjacent ones of said elements.

10. The combination set forth in claim 8, wherein said transverse relief grooves are disposed with a more gradual pitch from that of said helical cutting elements.

11. The method of making a hollow revolvable member for use in a mechanical separator adapted to produce boneless comminuted meat and other smooth comminuted food products, said method comprising the steps of:
a. forming a plurality of axially spaced helical cutting elements in said revolvable member at a given pitch and defining a plurality of constricted helical grooves communicating between the exterior and the interior of said revolvable member;
b. forming alternate ones of said helical cutting elements with an outer diameter defining the maximum outer diameter of said revolvable member;
c. forming the remaining ones of said helical cutting elements with an outer diameter substantially less than the outer diameter of said revolvable member;
d. forming circumferentially spaced transverse relief grooves defining corresponding circumferentially spaced teeth in the outer peripheral portion of said alternate ones of said helical cutting elements by traversing a cutting tool thereover at a different pitch from that of said cutting elements.

12. The method of claim 11, wherein said cutting tool is traversed at a pitch more gradual than that of said helical cutting elements and at a depth not exceeding half the difference between their respective outer diameters.

13. A machine as defined in claim 1, wherein said alternate ones of said helical cutting elements are formed with outer peripheral surfaces tapering radially toward their trailing edges.

14. A machine as defined in claim 1, wherein said outer peripheral surfaces of said alternate helical cutting elements taper radially to a diameter at their trailing edges substantially equal to the diameter of said remaining helical cutting elements.

15. The combination set forth in claim 7, wherein said alternate ones of said helical cutting elements are formed with outer peripheral surfaces tapering radially from their leading to their trailing edges.

* * * * *